United States Patent Office 3,027,367
Patented Mar. 27, 1962

3,027,367
6-SUBSTITUTED-16-METHYL-PREGNANE SERIES STEROIDS AND PROCESS FOR THEIR PRODUCTION
Frank H. Lincoln, Kalamazoo, William P. Schneider, Kalamazoo Township, Kalamazoo County, and George B. Spero, Kalamazoo, Mich., assignors to The Upjohn Company, Kalamazoo, Mich., a corporation of Delaware
No Drawing. Filed July 16, 1959, Ser. No. 827,447
5 Claims. (Cl. 260—239.55)

This invention relates to certain novel steroids and to a process for their production, more particularly to intermediates to and a process for the production of 6α-fluoro-11β,17α,21 - trihydroxy - 16α - methyl - 4 - pregnene-3,20-dione 21-acetate and 6α-fluoro-11β,17α,21-trihydroxy-16β-methyl-4-pregnene-3,20-dione 21-acetate.

6α-fluoro-11β,17α,21-trihydroxy-16α-methyl-4-pregnene-3,20-dione 21-acetate and 6α-fluoro-11β,17α,21-trihydroxy-16β-methyl-4 - pregnene - 3,20 - dione 21-acetate have profound hydrocortisone-like activity, including antiinflammatory and glucocorticoid activity, as well as being useful intermediates in the production of their 9α-fluoro-, $\Delta^{1,4}$-, and $\Delta^{1,4}$-9α-fluoro-analogues which also possess the above-described activity. The present process and novel steroids are useful in the production of these compounds and provide a new route thereto which, in many of its steps, gives greater yields of desired product than other routes, e.g., involving the $\Delta^4$-3-keto system. This is particularly true in the hydrofluorination step which gives about an 80% yield of 5α-hydroxy-6β-fluoro steroid whereas the comparable reaction on a 3-ketal of a $\Delta^4$-3-keto steroid gives a much lower yield of 5α-hydroxy-6β-fluoro steroid.

A route to the above-described physiologically active compounds which comprises the compounds and process of this invention can be represented by the following formulae:

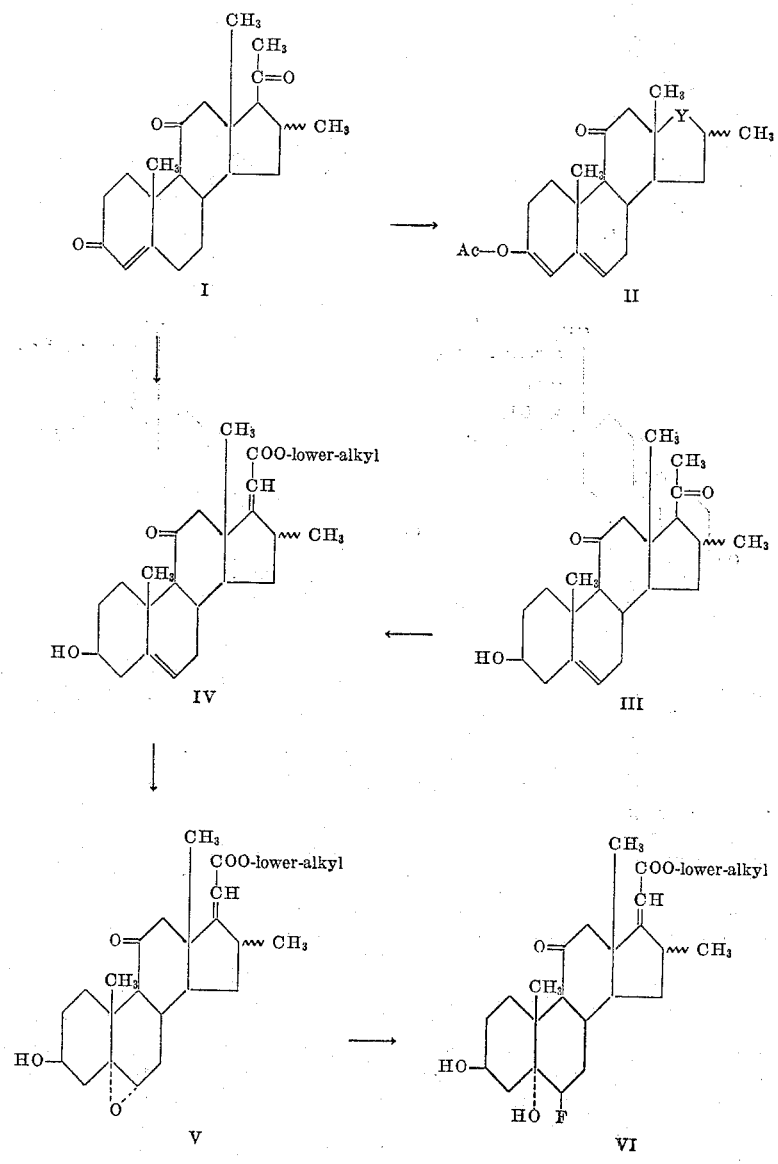

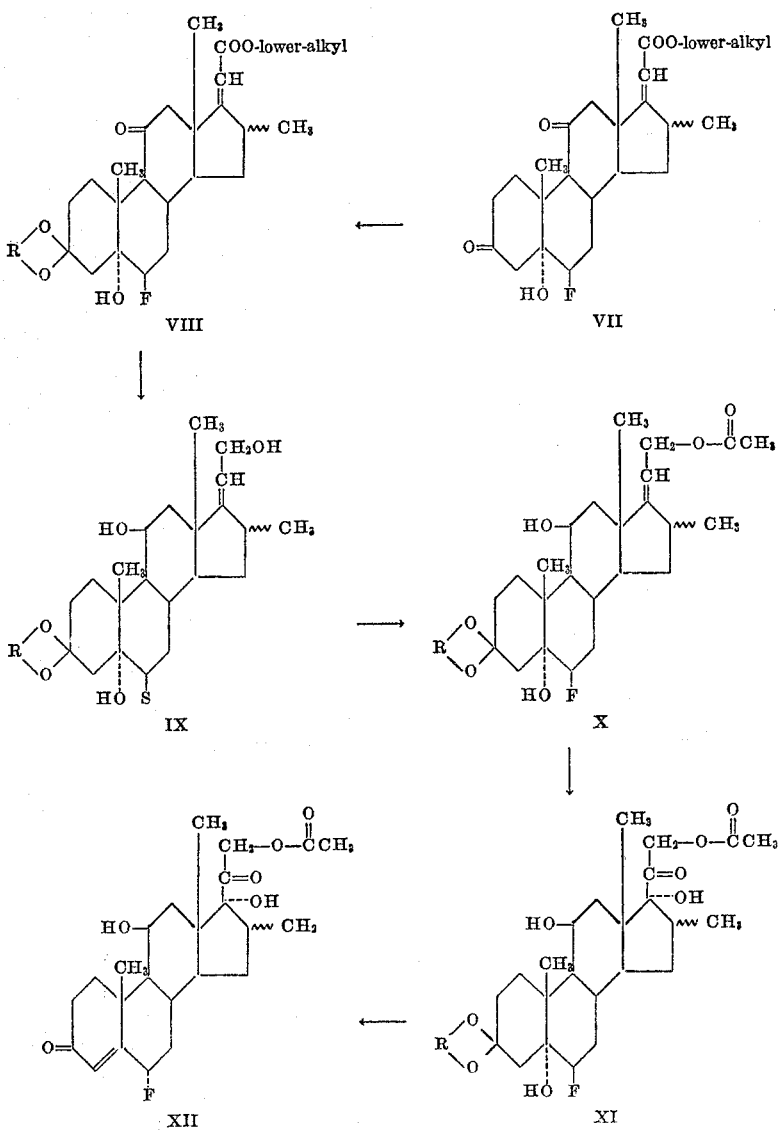

In the above formulae, Y is =C(O—Ac)CH₃, —C(O—Ac)=CH₂ or —COCH₃, Ac is the acyl radical of a lower-hydrocarbon carboxylic acid, and R is lower-alkylene containing from 2 to 3 carbon atoms in the ketal ring. Lower-hydrocarbon, lower-alkylene and lower-alkyl means containing from 1 to 8 carbon atoms, inclusive. The wavy line at the 16-position is a generic expression used to represent the 16α-methyl isomer, the 16β-methyl isomer, and mixtures of the two.

Starting compounds (I) for this route can be prepared from 16β-methylprogesterone [J. Romo et al., Bol. Inst. Quim. Univ. N. Auton. Mex., IV, 125 (1952); C.A. 9400a (1954)] in exactly the same way progesterone has been converted to 11-ketoprogesterone (e.g., 2,602,769), viz., by bioconversion of that compound with an organism capable of introducing an 11-hydroxy group, e.g., *Rhizopus arrhizus* or *Rhizopus nigricans* to produce 11α-hydroxy-16β-methylprogesterone, and the 11-hydroxy compound oxidized to an 11-keto group, e.g., with sodium dichromate or N-bromoacetamide in pyridine, to produce 11-keto-16β-methylprogesterone; and from 16α-methyl-progesterone by the same reactions, i.e., producing 11α-hydroxy-16α-methylprogesterone and 11-keto-16α-methylprogesterone; and from 11-keto-16-dehydroprogesterone by forming the 3-pyrrolidyl enamine thereof which is then reacted with methyl magnesium bromide or iodide in the presence of cuprous chloride to produce the 3-pyrrolidyl enamine of 11-keto-16α-methylprogesterone. The enamine is then hydrolyzed with sodium hydroxide in methanol to produce 11-keto-16α-methylprogesterone.

The first step of the process of this invention comprises converting the 3-keto group of I to an enol acylate thereof (II). In doing so, the 20-keto group can be retained unchanged or also converted to an enol acylate, as the same result is obtained in the next step in either case. The conversion of a steroid 3-keto group to a 3-enol acylate is a well known reaction. Generally the anhydride or the isopropenyl ester of an organic carbonyloxy acid, usually a hydrocarbon carboxylic acid and most often a lower-aliphatic acid, is employed at the refluxing temperature of the reaction mixture, e.g., 40–120° C. An aromatic hydrocarbon solvent, e.g., benzene or toluene, is often employed. More vigorous conditions will also convert the 20-keto group to an enol ester, e.g., higher reaction temperatures or stronger catalyst. Very vigorous conditions will also convert the 11-keto group to an enol ester. However, as stated above, whether or not the keto groups other than the 3-keto group are also converted to an enol ester in the enol acylation reaction is immaterial as all of the possible reaction products containing a 3-enol ester group are converted to the same reaction product in the next step of the process, i.e., the reductive hydrolysis step. Often the enol esterification reaction mixture will comprise both the 3-mono-enol acylate and the 3,20-di-enol acylate. Acetic anhydride and isopropenyl acetate are reagents frequently employed for converting 3-keto groups to enol esters. When isopropenyl acetate is employed, the usual procedure is to slowly distil the reaction mixture through a fractionating column to remove the acetone produced, thus forcing the reaction to completion. Mineral acids or strong organic acids, e.g., concentrated sulfuric acid or p-toluenesulfonic acid, are the catalysts ordinarily employed.

The next step of this invention is a reductive hydrolysis of the thus-produced enol acylate (II) at a temperature below about 10° C. with an aqueous solution of an alkaline ketonic reducing agent. In this step, the 3-enol ester is converted to a $\Delta^5$-3-hydroxy group and any other enol ester groups in the molecule are converted back to keto groups. The alkali-metal borohydrides and the alkali-metal trialkoxyborohydrides, e.g., sodium borohydride, potassium borohydride, sodium trimethoxyborohydride and sodium triethoxyborohydride are preferred reducing agents. A water miscible organic solvent, e.g., methanol, ethanol, tetrahydrofuran, is employed to solubilize the steroid. A temperature below room temperature is employed to achieve selectivity, i.e., reduction of the 3-keto group while leaving the 11- and 20-keto groups unaffected. Temperatures higher than about 10° C. result in a loss of selectivity and temperatures below about −20° C. result in a loss of reactivity.

Employing a temperature below 10° C. permits the use of a considerable chemical equivalent excess of reducing agent and, in fact, in excess is desirable to achieve optimum yields. For example, up to a 10 fold excess of reducing agent can be employed at 0° C. without significant loss of selectivity. Surprisingly, even if the starting steroid (II) contains a 20-keto group and a 3-enol ester group, the 20-keto group remains substantially unaffected. The reaction is ordinarily continued for several hours, depending in part upon the amount of reducing agent employed and the reaction temperature. Any excess reducing agent and the base produced in the reaction is decomposed with acid, e.g., acetic or dilute hydrochloric, and the steroid reaction product isolated in the usual manner, e.g., extraction with a water-immiscible solvent or concentrating the reaction mixture at reduced pressure and separating the precipitated steroid by filtration.

The above-described two-step reaction of converting I into III is applicable to $\Delta^4$-3,20-diketo steroids in general and provides a useful means of converting $\Delta^4$-3,20-diketo pregnane series steroids into $\Delta^5$-3-hydroxy-20-keto pregnane series steroids. These latter steroids are useful intermediates in the production of 6α-fluoro- and 6α-methyl-$\Delta^4$-3,20-diketo pregnane series steroids, which series of steroids are often more active than the corresponding compounds without the 6-substituent. Thus a $\Delta^5$-3-hydroxy-20-keto pregnane series steroid can be epoxidized with peracetic or perbenzoic acid, e.g., in the manner shown in the examples hereinafter, to introduce the 5α,6α-epoxy group which is then reacted with hydrogen fluoride to produce in high yield a 3,5α-dihydroxy-6β-fluoro-20-keto pregnane series steroid.

Examples of starting $\Delta^4$-3,20-diketo steroids include progesterone, 11-ketoprogesterone, 11α-hydroxyprogesterone, 9(11)-dehydroprogesterone. Preferred starting compounds are the $\Delta^4$-3,20-diketo steroids otherwise unsubstituted in the A ring and in the side chain.

The 3β-hydroxy-16α-methyl-5-pregnene-11,20-dione and 3β-hydroxy-16β-methyl-5-pregnene-11,20-dione (III) produced as described above are converted to 5α-hydroxy-6β-fluoro-3,11-diketo-16-methyl-17(20)-pregnen-21-oic acid lower-alkyl ester (VII) by the following series of reactions: First, the steroids are condensed with a lower-alkyl oxalate, lower-alkyl formate or lower-alkyl trifluoroacetate in the presence of an alkali-metal base condensation catalyst to produce an alkali-metal enolate of a 3β-hydroxy-16-methyl-21-carbonyl-5-pregnene-11,20-dione. This compound, preferably without isolation, is converted to the free enol thereof with glacial acetic acid and then brominated, in the presence of sufficient base to react with the hydrogen bromide formed in the reaction, with about 2.5 to 3 molar equivalents of bromine to produce a 3β-hydroxy-21,21-tetrabromo-16-methyl-5-pregnen-11,20-dione. This compound is then reacted with an alkali-metal alkoxide in an alkanol followed by zinc and acetic acid to produce a 3β-hydroxy-11-keto-16-methyl-5,17(20)-pregnadien-21-oic acid lower-alkyl ester (IV) as a mixture of the 17(20)-cis and trans isomers, both of which can be employed in the subsequent steps. The $\Delta^5$-double bond of this compound is then epoxidized, e.g., with peracetic or perbenzoic acid, to produce 3β-hydroxy-5α,6α-epoxy-11-keto-16-methyl - 17(20) - pregnen-21-oic acid lower-alkyl ester (V). The epoxy group of this compound is then hydrofluorinated with aqueous or anhydrous hydrogen fluoride under the usual reaction conditions to produce 3β,5α-dihydroxy-6β-fluoro-11-keto-16-methyl-17(20)-pregnen-21-oic acid lower-alkyl ester (VI). The 3-hydroxy group of this compound is then oxidized, e.g., with chromic acid, sodium dichromate, or an N-haloamide or N-haloimide in pyridine, to produce 3,11-diketo-5α-hydroxy-6β - fluoro - 16 - methyl - 17(20)-pregnen-21-oic acid lower-alkyl ester (VII). The conversion of this compound to 6α-fluoro-11β,17α,21-trihydroxy-16-methyl - 4 - pregnene - 3,20 - dione 21-acetate (XII) is shown in the examples hereinafter.

The following examples are illustrative of the products and processes of this invention, but are not to be construed as limiting.

PREPARATION 1

*11-Keto-16α-Methylprogesterone*

To a hot solution of 4.56 g. (0.014 mole) of 11-keto-16-dehydroprogesterone in 45 ml. of methanol was added 2.25 ml. of pyrrolidine with swirling. The reaction product, the 3-pyrrolidyl enamine of 11-keto-16-dehydroprogesterone, soon separated as yellowish crystals. After cooling to 5°, the mixture was filtered, the cake washed with cold methanol and dried under vacuum. There was obtained 4.56 g. of 3-pyrrolidyl-3,5,16-pregnatriene-11,20-dione melting at 154 to 169° C.

A solution of the thus obtained enamine in 110 ml. of tetrahydrofuran was added slowly to a stirred mixture of 45 ml. of commercial three molar methyl magnesium bromide ether solution, 0.90 g. of cuprous chloride and 50 ml. of tetrahydrofuran. The mixture was cooled to room temperature and stirred under a nitrogen atmosphere for 3 hours. The excess Grignard reagent was cautiously destroyed by the dropwise addition of 29 ml. of water. To the mixture, containing 3-pyrrolidyl-16α-methyl-3,5-pregnadiene-11,20-dione, was added 18 ml. of acetic acid and 72 ml. of methanol and the mixture was warmed until a clear dark yellow solution was obtained. 103 ml. of a 10% aqueous solution of sodium hydroxide was added, bringing the pH to 8. The mixture was heated under reflux for 45 minutes. 5 ml. of acetic acid and 250 ml. of water were added and the cooled mixture was extracted 3 times with methylene chloride. The combined extracts were washed with an aqueous sodium bicarbonate solution, water and then dried with sodium sulfate. The dried solution was evaporated and the residue, consisting essentially of 11-keto-16α-methylprogesterone, was dissolved in 400 ml. of methylene chloride and chromatographed through a 200-g. column of magnesium silicate (Florisil). The column was developed with 400-mil. portions of solvent of the following composition and order: 5 of hexanes (Skellysolve B) plus 3% acetone, 5 of hexanes plus 5% acetone, 8 of hexanes plus 7% acetone, 5 of hexanes plus 10% acetone, 4 of hexanes plus 15% acetone and finally, 1 of acetone. Fractions 9 to 25 (counting the methylene chloride fraction) were combined and recrystallized from a mixture of acetone and water to give 2.03 g. of 11-keto-16α-methylprogesterone melting at 179 to 182° C. A sample recrystallized from a mixture of ethyl acetate and hexanes melted at 183 to 185° C. and an $[\alpha]_D$ of plus 225° ($CHCl_3$), $\lambda_{max.}^{alc.}$ 238 m$\mu$, $a_M$ 15,850

PREPARATION 2

*11-Keto-16β-Methylprogesterone*

A medium was prepared containing 10 g. of Cerelose dextrose technical grade and 20 g. of corn steep liquor (60% solids) in sufficient tap water to make up 1 l. of solution. 100 l. of such medium was adjusted by the addition of 25% sodium hydroxide solution to a pH of 5. 400 ml. of lard oil and lard-oil octadecanol was added as an anti-foaming agent. This medium was sterilized for 45 minutes at 20 pounds' pressure and inoculated with *Rhizopus nigricans* minus strain, American Type Culture Collection No. 6227b, and incubated for 24 hours at a temperature of 28° C. using a rate of aeration and stirring such that the oxygen uptake was 6.3 to 7 millimoles per hour per milliliter of sodium sulfate according to the method of Cooper, Fernstrom and Miller, Ind. Eng. Chem. 36, 504 (1944). To this medium containing a 24-hour growth of *Rhizopus nigricans* minus strain was added 6 g. of 16β-methylprogesterone in 150 ml. of acetone to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvents were added to the beer filtrate. The mixed extracts and beer filtrate were extracted successively with 2 one-half by volume portions of methylene chloride and then with 2 one-fourth by volume portions of methylene chloride. The combined methylene chloride extracts were washed with 2 one-tenth by volume portions of a 2% aqueous solution of sodium bicarbonate and then with 2 one-tenth by volume portions of water. After drying the methylene chloride extracts with about 3 to 5 g. of anhydrous sodium sulfate per liter of solvent and filtering, the solvent was removed by distillation. The residue was dissolved in a minimum of methylene chloride, filtered and the solvent then evaporated. The crude 11α-hydroxy-16β-methylprogesterone was oxidized directly to 11-keto-16β-methylprogesterone.

A solution was prepared containing 3.5 g. of the crude 11α-hydroxy-16β-methylprogesterone in 240 ml. of acetic acid at room temperature. A solution of 0.82 g. of chromium trioxide in 82 ml. of acetic acid and 0.8 ml. of water was added dropwise. During the addition the temperature was maintained between 20 to 23° C. and thereafter for another period of 1 and one-half hours. The reaction mixture was then diluted with one l. of water and extracted with 6 150-ml. portions of methylene chloride. The extracts were combined, washed with dilute sodium bicarbonate solution and water, dried over anhydrous sodium sulfate and evaporated to dryness under reduced pressure. There was thus obtained 11-keto-16β-methylprogesterone.

EXAMPLE 1

*3,20-Dihydroxy-16α-Methyl-3,5,20-Pregnatrien-11-one 3,20-Diacetate*

A mixture of 2.50 g. of 16α-methyl-4-pregnene-3,11,20-trione, 20 ml. of isopropenyl acetate and 0.2 ml. of concentrated sulfuric acid was heated under reflux in a nitrogen atmosphere for 1 hour. Five ml. of distillate was then removed and refluxing was continued for an additional hour. 200 mg. of sodium acetate was added and the mixture evaporated to dryness at reduced pressure. The residue was extracted with methylene chloride which was then filtered, diluted with 20 ml. of methanol and then slowly concentrated on a steam bath until crystallization began. The mixture was then chilled and the resulting precipitate separated by filtration, washed with a small amount of methanol and dried to give 1.6 g. of 3,20-dihydroxy-16α-methyl-3,5,20-pregnatrien-11 - one 3, 20-diacetate melting at 125–129° C. A sample was recrystallized twice from methanol to give colorless rods melting at 142–146° C., $[\alpha]_D$ —55° ($CHCl_3$), and having the correct elemental analysis.

Following the above procedure, but substituting 16β-methyl-4-pregnene-3,11,20-trione as the starting steroid, there is thus produced 3,20-dihydroxy-16β-methyl-3,5,20-pregnatrien-11-one 3,20-diacetate.

Similarly, other 3,20-dienolacylates of the above-described starting compounds are produced wherein the acyl radical of the acylate group is, e.g., that of a lower-hydrocarbon carboxylic acid, e.g., propionic, butyric, valeric, hexanoic, heptanoic, or octanoic acid, by substituting the corresponding isopropenyl ester of one of these acids for the isopropenyl acetate employed in the reaction described in Example 1.

EXAMPLE 2

*3-Hydroxy-16α-Methyl-3,5-Pregnadiene-11,20-Dione 3-Acetate*

A mixture of 1.00 g. of 16α-methyl-4-pregnene-3,11,20-trione, 150 mg. of p-toluenesulfonic acid, 10 ml. of isopropenyl acetate and 100 ml. of benzene was slowly distilled through a 12 inch Vigreaux fractionating column for 4 hours, during which time 85 ml. of distillate was collected. The residue was cooled, washed with cold aqueous sodium bicarbonate, dried and evaporated to dryness at reduced pressure. The oily residue was mixed with 25 ml. of methylcyclohexane and again reduced to dryness. The crystalline residue was recrystallized from methanol to give 0.75 g. of 3-hydroxy-16α-methyl-3,5-pregnadiene-11,20-dione 3-acetate melting at 145–148° C. Further recrystallization from methanol gave an analytical sample as plates, M.P. 146–148° C., $[\alpha]_D$ plus 23° ($CHCl_3$), having the correct elemental analysis.

Following the above procedure, but substituting 16β-methyl-4-pregnene-3,11,20-trione as the starting steroid, there is thus produced 3-hydroxy-16β-methyl-3,5-pregnadiene-11,20-dione 3-acetate.

Similarly, other 3-enolacylates of the above-described starting compounds are produced wherein the acyl radical of the acylate group is, e.g., that of a lower-hydrocarbon carboxylic acid, e.g., propionic, butyric, valeric, hexanoic, heptanoic, or octanoic acid, by substituting the corresponding isopropenyl ester of one of these acids for the isopropenyl acetate employed in the reaction described in Example 2.

EXAMPLE 3

*3β-Hydroxy-16α-Methyl-5-Pregnene-11,20-Dione*

A solution of 1.00 g. (2.34 mM.) of 3,20-dihydroxy-16α-methyl-3,5,20-pregnatrien-11-one 3,20-diacetate in 25 ml. of ether and 50 ml. of methanol was cooled to 0° C.

and to the solution was then added, portionwise over a 5-minute period, 3.3 g. (23 mM.) of sodium trimethoxyborohydride in 70% aqueous methanol. The mixture was stirred at 0–3° C. for 4 hours, neutralized with dilute hydrochloric acid, and then concentrated at reduced pressure. The crystals which separated were collected, washed with water and dried. There was obtained 0.64 g. of 3β-hydroxy-16α-methyl-5-pregnene-11,20-dione melting at 148–156° C. A recrystallization from a mixture of acetone and hexanes, from acetone and then again from acetone and hexanes gave an analytical sample as needles, M.P. 198–199° C., [α]$_D$ plus 37° (CHCl$_3$), having the correct elemental analysis.

Following the above procedure, but substituting 3,20-dihydroxy-16β-methyl-3,5,20-pregnatrien-11-one 3,20-diacetate as the starting steroid, there is thus produced 3β-hydroxy-16β-methyl-5-pregnene-11,20-dione.

Similarly, other 3,20-dihydroxy-16α-methyl-3,5,20-pregnatrien-11-one 3,20-diacylates and 3β,20-dihydroxy-16β-methyl-3,5,20-pregnatrien-11-one 3,20-diacylates wherein the acyl radical of the acylate groups is, e.g., that of a lower-hydrocarbon carboxylic acid, e.g., propionic, butyric, valeric, hexanoic, heptanoic, or octanoic acid, are converted according to the process of Example 3 to 3β-hydroxy-16α-methyl-5-pregnene-11,20-dione and 3β-hydroxy-16β-methyl-5-pregnene-11,20-dione, respectively.

EXAMPLE 4

3β-Hydroxy-16α-Methyl-5-Pregnene-11,20-Dione

A solution of 0.50 g. (1.3 mM.) of 3-hydroxy-16α-methyl-3,5-pregnadiene-11,20-dione 3-acetate in 12.5 ml. of ether and 25 ml. of methanol was cooled to 0° C. and to the solution was then added in one portion an ice cold solution of 0.93 g. (6.5 mM.) of sodium trimethyborohydride in 12.5 ml. of 70% aqueous methanol. Stirring was continued for 1 hour at 0–2° C., the mixture was acidified with dilute hydrochloric acid and then concentrated to a small volume at reduced pressure. The crystalline residue, M.P. 143–155° C., was dissolved in benzene and chromatographed on 20 g. of acid-washed alumina. The column was eluted with 5 40-ml. portions of hexanes plus 10% acetone, 10 40-ml. portions of hexanes plus 15% acetone, 5 40-ml. portions of hexanes plus 20% acetone and 1 40-ml. portion of acetone. Fractions 5–7 contained a small amount of 16α-methyl-4-pregnene-3,11,20-trione; fractions 8–16 contained 332 mg. of 3β-hydroxy-16α-methyl-5-pregnene-11,20-dione and fractions 20–21 contained a small amount of 3β,20-dihydroxy-16α-methyl-5-pregnen-11-one. A small amount of 3α-hydroxy-16α-methyl-5-pregnene-11,20-dione was also recovered from fractions 8–16 after recrystallizing the solids from these fractions from a mixture of hexanes and acetone.

Following the above procedure, but substituting 3β-hydroxy-16β-methyl-3,5-pregnadiene-11,20-dione 3-acetate as the starting steroid and NaBH$_4$ as the reducing agent, there is thus produced 3β-hydroxy-16β-methyl-5-pregnene-11,20-dione.

Similarly, other 3-hydroxy-16α-methyl-3,5-pregnadiene-11,20-dione 3-acylates and 3-hydroxy-16β-methyl-3,5-pregnadiene-11,20-dione 3-acylates wherein the acyl radical of the acylate group is, e.g., that of a lower-hydrocarbon carboxylic acid, e.g., propionic, butyric, valeric, hexanoic, heptanoic, or octanoic acid, are converted according to the process of Example 4 to 3β-hydroxy-16α-methyl-5-pregnene-11,20-dione and 3β-hydroxy-16β-methyl-5-pregnene-11,20-dione, respectively.

EXAMPLE 5

3β-Hydroxy-11-Keto-16α-Methyl-5,17(20)-Pregnadiene-21-oic Acid Methyl Ester

To a stirred solution of 1.72 g. of 3β-hydroxy-16α-methyl-5-pregnene-11,20-dione in 25 ml. of t-butyl alcohol under a nitrogen atmosphere at 60° C. was added 2.8 ml. (4 mol. equiv.) of ethyl oxalate followed by 2.6 g. of a 25.7% w./w. solution of sodium methoxide (2.5 mol. equiv.) in methanol. Heating was stopped and the cloudy yellow-orange solution was stirred for 1 hour. 0.72 ml. (2.5 mol. equiv.) of acetic acid and 0.83 g. (2 mol. equiv.) of sodium acetate in 25 ml. of methanol was added to convert the thus-produced 3β-hydroxy-16α-methyl-21-ethoxyoxalyl-5-pregnen-11-one sodium enolate to the free enol thereof. The solution was cooled to 0° C. and there was then added 2.1 g. (2.62 mol. equiv.) of bromine in 20 ml. of ice-cold methanol. To the solution of the thus-produced 3β-hydroxy-16α-methyl-21,21-dibromo-5-pregnen-11-one was then added 5.37 g. (5.12 mol. equiv.) of sodium methoxide as a 25.7% solution in methanol. The cooling bath was removed and stirring was continued for 2 hours. Then 1.5 g. of zinc dust and 8 ml. of acetic acid were added and stirring was continued for another 30 minutes. The solids were removed by filtration and the filtrate evaporated at reduced pressure to a paste which was shaken with methylene chloride and water. The methylene chloride extracts were dried, evaporated to dryness, dissolved in benzene and chromatographed on 100 g. of magnesium silicate (Florisil). The column was eluted with 200-ml. fractions of solvent of the following composition and order: 5 of hexanes (Skellysolve B) plus 4% acetone, 10 of hexanes plus 6% acetone, 5 of hexanes plus 8% acetone, 5 of hexanes plus 10% acetone and 1 of acetone. Fractions 8–21 contained 1.659 g. of a mixture of the cis and trans isomers of 3β-hydroxy-11-keto-16α-methyl-5,17(20)-pregnadien-21-oic acid methyl ester.

Fractions 8–10 were crystallized from methanol to give 3β-hydroxy-11-keto-16α-methyl-5,17(20)-[trans]-pregnadien-21-oic acid methyl ester melting at 193–195° C., [α]$_D$ −72° (CHCl$_3$).

Fractions 17–21 were crystallized from methanol to give 3β-hydroxy-11-keto-16α-methyl-5,17(20-[cis]-pregnadien-21-oic acid methyl ester melting at 106–108° C., [α]$_D$ −64° (CHCl$_3$).

Following the above procedure, but substituting 3β-hydroxy-16β-methyl-5-pregnen-11,20-dione as the starting steroid there is thus produced the cis and trans isomers of 3β-hydroxy-11-keto-16β-methyl-5,17(20-pregnadien-21-oic acid methyl ester. Other lower-alkyl esters of the above-described 21-oic acids are produced by substituting other alkali-metal lower-alkoxides in a lower-alkanol, e.g., sodium ethoxide in ethanol, sodium propoxide in propanol, for the sodium methoxide in methanol employed in the reaction described in Example 5.

EXAMPLE 6

3β-Hydroxy-5α,6α-Epoxy-11-Keto-16α-Methyl-17(20)-Pregnen-21-oic Acid Methyl Ester 0.2 g. of sodium acetate was suspended in a solution of 1.00 g. of a mixture of the isomers of 3β-hydroxy-11-keto-16α-methyl-5,17(20)-pregnadien-21-oic acid methyl ester in 25 ml. of chloroform. The mixture was cooled to 0° C., 2 ml. of 40% peracetic acid was added thereto and the mixture was stirred for 2 hours at 0–5° C. and then for 2.5 hours at 5–10° C. A solution of 0.5 g. of soduim sulfite in 10 ml. of water was added, the cooling bath was removed and stirring was continued for 0.5 hour longer. The organic layer was separated, washed with 5% aqueous sodium hydroxide and then water, dried and evaporated to dryness. The residue was dissolved in benzene and chromatographed on 50 g. of magnesium silicate. The column was eluted with 100-ml. portions of solvent of the following composition and order: 5 of hexanes plus 7% acetone, 10 of hexanes plus 10% acetone and 5 of hexanes plus 15% acetone. Fractions 9–17 contained a mixture of the cis and trans isomers of 3β- hydroxy - 5α,6α - epoxy - 11 - keto-16α-methyl-17(20)-pregnen-21-oic acid methyl ester.

Fractions 9–12 were crystallized twice from a mixture of hexanes and acetone to give 3β-hydroxy-5α,6α-epoxy-11-keto-16α-methyl-17(20)-[trans]-pregnen - 21-oic acid methyl ester as prisms, M.P. 191–193° C., [α]$_D$ —72° (CHCl$_3$).

Fractions 13–17 were crystallized twice from a mixture of hexanes and acetone to give 3β-hydroxy-5α,6α-epoxy-11-keto-16α-methyl-17(20)-[cis]-pregnen - 21 - oic acid methyl ester as needles, M.P. 156–158° C., [α]$_D$ —68° (CHCl$_3$).

Following the above procedure, but substituting 3β-hydroxy-11-keto-16β-methyl-5,17(20) - pregnadien - 21-oic acid methyl ester as the starting steroid there is thus produced the cis and trans isomers of 3β-hydroxy-5α, 6α-epoxy-11-keto-16β-methyl-17(20)-pregnen - 21 - oic acid methyl ester. Substituting other lower-alkyl esters, e.g., ethyl, propyl, octyl, for the methyl ester of the above-described 21-oic acids is productive of the corresponding lower-alkyl reaction product.

EXAMPLE 7

*3β,5α - Dihydroxy - 6β - Fluoro-11 - Keto - 16α - Methyl-17(20)-Pregnen-21-oic Acid Methyl Ester*

To a Dry-Ice cooled mixture of 8 g. of hydrogen fluoride, 16 ml. of tetrahydrofuran and 5 ml. of methylene chloride was added a cold solution of 3.00 g. of a mixture of the cis and trans isomers of 3β-hydroxy-5α,6α-epoxy-11-keto-16α-methyl-17(20)-pregnen - 21 - oic acid methyl ester in 20 ml. of methylene chloride. The mixture was kept at —10° C. for 2 hours and then at 5° C. for 2.5 hours. The excess hydrogen fluoride was neutralized in an ice-cold solution of 35 g. of sodium bicarbonate in water. The organic layer was separated and the aqueous layer extracted with methylene chloride. The combined organic layers were dried and then evaporated to dryness to give a residue consisting of the cis and trans isomers of 3β,5α-dihydroxy-6β-fluoro-11-keto-16α-methyl-17(20)-pregnen-21-oic acid methyl ester.

The cis and trans isomers can be separated by fractional crystallization from a mixture of acetone and hexanes, preferably after purifying the reaction product by chromatography on magnesium silicate, e.g., in the manner described in Example 6.

Following the same procedure, but substituting 3β-hydroxy - 5α,6α - epoxy - 11 - keto-16β-methyl-17(20)-pregnen-21-oic acid methyl ester as the starting steroid, there is thus produced 3β,5α - dihydroxy-6β-fluoro-11-keto-16β-methyl-17(20)-pregnen-21-oic acid methyl ester.

Substituting other lower-alkyl esters of the above-described 21-oic acids as starting steroids, e.g., ethyl, propyl, octyl, there is thus produced the corresponding lower-alkyl ester of the 21-oic acid reaction products described above.

EXAMPLE 8

*3,11-Diketo-5α-Hydroxy-6β-Fluoro-16α-Methyl-17(20)-Pregnen-21-oic Acid Methyl Ester*

The total steroid product of the reatcion described in Example 7 was dissolved in 30 ml. of acetic acid and the solution was cooled to 15° C. A similarly cooled solution of 3.0 g. of sodium dichromate dihydrate in 50 ml. of acetic acid was added and the mixture was stirred at room temperature for 1.5 hours. The mixture was then poured into ice water and the precipitated steroid separated by filtration, dissolved in methylene chloride and the solution, after drying with sodium sulfate, was poured onto a column of 200 g. of magnesium silicate. The column was eluted with 350-ml. portions of solvent of the following composition and order: 5 of hexanes plus 5% acetone, 10 of hexanes plus 10% acetone and 5 of hexanes plus 15% acetone. Fractions 7–14 contained 2.20 g. of a mixture of the cis and trans isomers of 3,11-diketo-5α-hydroxy-6β-fluoro-16α-methyl-17(20)-pregnen-21-oic acid methyl ester.

The cis and trans isomers can be separated by fractional crystallization from a mixture of acetone and hexanes, preferably after purifying the reaction product by chromatography on magnesium silicate, e.g., in the manner described in Example 6.

Following the same procedure, but substituting 3β,5α-dihydroxy - 6β - fluoro - 11 - keto - 16β - methyl - 17(20)-pregnen-21-oic acid methyl ester as the starting steroid, there is thus produced 3,11-diketo-5α-hydroxy-6β-fluoro-16α-methyl-17(20)-pregnen-21-oic acid methyl ester.

Substituting other lower-alkyl esters of the above-described 21-oic acids as starting steroids, e.g., ethyl, propyl, octyl, there is thus produced the corresponding lower-alkyl ester of the 21-oic acid reaction products described above.

*3-Ethylenedioxy-5α,11β,21-Trihydroxy-6β-Fluoro-16α-Methyl-17(20)-Pregnene 21-Acetate*

A mixture of 2.3 g. of 3,11-diketo-5α-hydroxy-6β-fluoro-16α-methyl-17(20)-pregnen-21-oic acid methyl ester, 100 ml. of benzene, 0.1 g. of p-toluenesulfonic acid and 10 ml. of ethylene glycol was heated under reflux with concomitant removal of water for 3.5 hours. The mixture was cooled, washed free of acid with aqueous sodium bicarbonate, dried and evaporated to give a residue of 3-ethylenedioxy-5α-hydroxy-6β-fluoro-11-keto-16α-methyl-17(20)-pregnen-21-oic acid methyl ester.

A solution of this reaction product in 50 ml. of ether was added over a 10-minute period to a stirred suspension of 2.0 g. of lithium aluminum hydride in 100 ml. of ether under a nitrogen atmosphere. After 1.5 hours the excess lithium aluminum hydride was decomposed with 25 ml. of ethyl acetate followed by 50 ml. of water. The organic phase was separated and the aqueous phase extracted 4 times with ether. The combined extracts were dried and evaporated to give a partially crystalline residue of 3 - ethylenedioxy-5α,11β,21-trihydroxy-6β-fluoro-16α-methyl-17(20)-pregnene.

This reaction product was maintained overnight in a mixture of 15 ml. of acetic anhydride and 15 ml. of pyridine. The mixture was then poured into ice water and the precipitated steroid, separated, washed thoroughly and dried. There was obtained 2.23 g. of 3-ethylenedioxy - 5α,11β,21 - trihydroxy - 6β - fluoro - 16α - methyl-17(20)-pregnene-21-acetate. A portion was recrystalized twice from a mixture of hexanes and acetone to give plates melting at 176–180° C., [α]$_D$ —1° (CHCl$_3$).

Following the above procedure, but substituting 3,11-diketo - 5α - hydroxy - 6β - fluoro - 16β - methyl - 17 (20)-pregnen-21-oic acid as the starting steroid, there is thus produced 3 - ethylenedioxy - 5α,11β,21 - trihydroxy-6β-fluoro-16β-methyl-17(20)-pregnene 21-acetate.

Other lower-alkyl esters of the above-described starting 21-oic acids, e.g., ethyl, propyl, octyl, are also converted, according to the above-described procedure, to 3-ethylenedioxy - 5α,11β,21 - trihydroxy - 6β - fluoro - 16α - methyl - 17(20) - pregnene 21-acetate and 3-ethylenedioxy - 5α,11β,21 - trihydroxy - 6β - fluoro - 16β-fluoro - 16β - methyl - 17(20) - pregnene 21-acetate, respectively.

*6α-Fluoro-11β,17α,21-Trihydroxy-16α-Methyl-4-Pregnene-3,20-Dione 21-Acetate*

To a stirred solution of 2.00 g. of 3-ethylenedioxy-5α,11β,21 - trihydroxy - 6β - fluoro - 16α - methyl - 17 (20)-pregnene 21-acetate in 50 ml. of tertiary butyl alcohol and 1 ml. of pyridine was added a solution of 7.2 ml. of N-methylmorpholine oxide peroxide in tertiary butyl alcohol, titrating 41.6 ml. of 0.1 N sodium thiosulfate per ml., followed by about 20 mg. of osmium tetroxide. The mixture was maintained for about 16 hours at room temperature and then mixed with 0.25 g. of sodium hydrosulfite in 25 ml. of water. The mixture was concentrated to about ⅔ volume at reduced pressure and then extracted with methylene chloride. The extracts were dried and then chromatographed on 100 g. of Florisil. The column was eluted with 200-ml. portions of solvent of the following composition and order: 5 of hexanes plus 5% acetone, 5 of hexanes plus 7.5% acetone, 10 of hexanes plus 10% acetone and 5 of hexanes plus 15% acetone. Fractions 3–7 contained unreacted starting material. Fractions 12 to 18 contained 3 - ethylenedioxy - 5α,11β,17α,21 - tetrahydroxy - 6β-fluoro-16α-methylpregnan-20-one 21-acetate which was used directly in the next step.

The reaction product from Fractions 12 to 18 was dissolved in 20 ml. of chloroform containing 0.2 ml. of absolute ethanol and cooled to —5° C. With continued cooling dry hydrogen chloride was bubbled into the solution for 1 hour while maintaining the temperature below 3° C. The solution was then cautiously washed with aqueous sodium bicarbonate, dried and evaporated. The residue was chromatographed on 50 g. of magnesium silicate which was then developed with 100-ml. portions of solvent of the following composition and order: 5 of hexanes plus 10% acetone, 5 of hexanes plus 15% acetone and 5 of hexanes plus 20% acetone. Fractions 8–14 contained 6α - fluoro - 11β,17α,21 - trihydroxy-16α - methyl - 4 - pregnene - 3,20 - dione 21-acetate which was crystallized from a mixture of hexanes and acetone to give 2 crops of prisms, the first of which melted at 240–245° C. (dec.) and the second at 241–245° C. (dec.).

Following the above procedure, but substituting 3-ethylenedioxy - 5α,11β,21 - trihydroxy - 6β - fluoro - 16β-methyl - 17(20) - pregnene 21-acetate as the starting steroid, there is thus produced 6α-fluoro-11β,17α,21-trihydroxy-16β-methyl-4-pregnene-3,20-dione 21-acetate.

We claim:
1. The process which comprises the steps of converting at least the 3-keto group of 16α-methyl-4-pregnene-3,11,20-trione to the enol acetate thereof and then contacting the thus-produced enol acetate with less than 10 chemical equivalents of an aqueous solution of sodium trimethoxyborohydride at about 0° C. and recovering the thus-produced 3β - hydroxy - 16α - methyl - 5 - pregnene-11,20-dione.

2. A compound represented by the following structural formula:

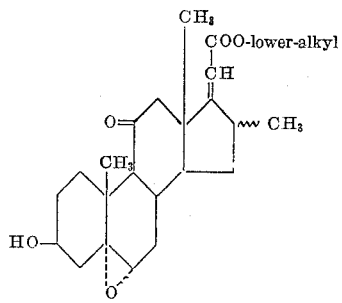

3. 3β - hydroxy - 5α,6α - epoxy - 11 - keto - 16α-methyl-17(20)-pregnen-21-oic acid methyl ester.

4. A compound represented by the following structural formula:

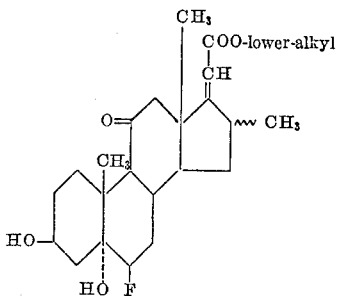

5. 3β,5α - dihydroxy - 6β - fluoro - 11 - keto - 16α-methyl-17(20)-pregnen-21-oic acid methyl ester.

References Cited in the file of this patent
UNITED STATES PATENTS

| | | |
|---|---|---|
| 2,838,490 | Babcock et al. | June 10, 1958 |
| 2,838,500 | Campbell et al. | June 10, 1958 |
| 2,838,528 | Campbell et al. | June 10, 1938 |
| 2,838,532 | Spero et al. | June 10, 1958 |
| 2,838,541 | Magerlein et. at. | June 10, 1958 |
| 2,916,486 | Babcock | Dec. 8, 1959 |

OTHER REFERENCES

Uskokovic et al.: J. Org. Chem., vol. 23 (1958), pp. 1947–1951 (page 1948 relied on).

Zderic et al.: J. Am. Chem. Soc., vol. 80 (1958), pp. 2596–2597 (p. 2596 relied on).

UNITED STATES PATENT OFFICE
CERTIFICATE OF CORRECTION

Patent No. 3,027,367            March 27, 1962

Frank H. Lincoln et al.

It is hereby certified that error appears in the above numbered patent requiring correction and that the said Letters Patent should read as corrected below.

Columns 1 and 2, strike out the arrow pointing downwardly under formula I, and insert the arrow in the same position under formula II; columns 3 and 4, formula IX, should appear as shown below instead of as in the patent:

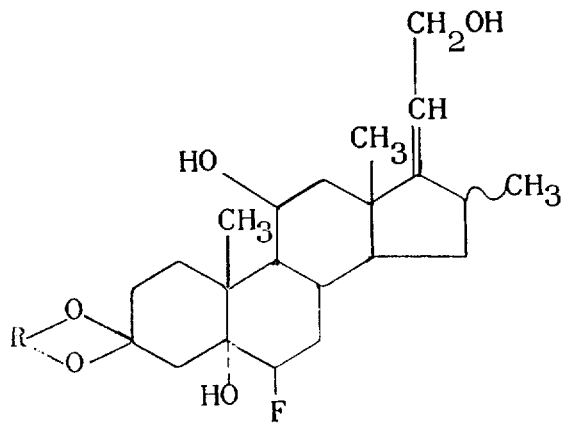

column 12, lines 63 and 64, strike out "-16β-fluoro".

Signed and sealed this 7th day of August 1962.

(SEAL)
Attest:
ERNEST W. SWIDER
Attesting Officer

DAVID L. LADD
Commissioner of Patents